(12) United States Patent
Saka et al.

(10) Patent No.: US 10,884,641 B2
(45) Date of Patent: Jan. 5, 2021

(54) LOW LATENCY GATEWAY FOR AN ASYNCHRONOUS ORCHESTRATION ENGINE USING DIRECT MEMORY

(71) Applicant: PayPal, Inc., San Jose, CA (US)

(72) Inventors: Veera Saka, Bangalore (IN); Jian Wan, Cupertino, CA (US); Rama Prasad Bodepu, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 79 days.

(21) Appl. No.: 16/385,461

(22) Filed: Apr. 16, 2019

(65) Prior Publication Data

US 2020/0333956 A1    Oct. 22, 2020

(51) Int. Cl.
| | | |
|---|---|---|
| G06F 3/06 | (2006.01) | |
| G06F 12/02 | (2006.01) | |
| G06F 9/46 | (2006.01) | |
| G06F 9/455 | (2018.01) | |

(52) U.S. Cl.
CPC ............ *G06F 3/064* (2013.01); *G06F 3/0611* (2013.01); *G06F 3/0688* (2013.01); *G06F 9/45558* (2013.01); *G06F 9/466* (2013.01); *G06F 12/0253* (2013.01); *G06F 2009/45583* (2013.01); *G06F 2009/45595* (2013.01)

(58) Field of Classification Search
CPC ...... G06F 3/064; G06F 3/0611; G06F 3/0688; G06F 9/45558; G06F 9/466; G06F 12/0253; G06F 2009/45583; G06F 2009/45595
USPC ........................................................ 711/112
See application file for complete search history.

(56) References Cited

U.S. PATENT DOCUMENTS

| | | |
|---|---|---|
| 2002/0165994 A1 | 11/2002 | Chappell |
| 2002/0169556 A1 | 11/2002 | Sokolov et al. |
| 2002/0199176 A1 | 12/2002 | Sokolov et al. |
| 2003/0028865 A1 | 2/2003 | Sokolov et al. |
| 2003/0229766 A1 | 12/2003 | Dice et al. |
| 2004/0073764 A1 | 4/2004 | Andreasson |
| 2004/0078381 A1 | 4/2004 | Blandy et al. |
| 2005/0004884 A1 | 1/2005 | Lake |

(Continued)

OTHER PUBLICATIONS

Al Bahra, "Nonblocking Algorithms and Scalable Multicore Programming," vol. 11, issue 5, Jun. 11, 2013, 39 pages.

(Continued)

*Primary Examiner* — Charles Rones
*Assistant Examiner* — Han V Doan
(74) *Attorney, Agent, or Firm* — Amin, Turocy & Watson, LLP

(57) ABSTRACT

Systems and techniques for providing a low latency gateway for an asynchronous orchestration engine using direct memory are presented. A system can directly allocate an array memory space within a first data structure for transaction data associated with transaction requests for an online transaction system. The system can sequentially store respective data threads of the transaction data into respective memory blocks of the array memory space within the first data structure. The system can also sequentially separate the memory blocks of the array memory space within the first data structure into data channels for storage in a second data structure. Furthermore, the system can respectively format data channels and convert the data channels into communication pathways for the online transaction system based on at least one serialization technique for transmission to one or more memories of a virtual machine of the online transaction system.

20 Claims, 10 Drawing Sheets

(56) References Cited

U.S. PATENT DOCUMENTS

| | | |
|---|---|---|
| 2005/0044540 A1 | 2/2005 | Savov |
| 2005/0086659 A1 | 4/2005 | Huras et al. |
| 2005/0160416 A1 | 7/2005 | Jamison |
| 2005/0240641 A1 | 10/2005 | Kimura et al. |
| 2006/0230087 A1 | 10/2006 | Andreasson |
| 2006/0248042 A1 | 11/2006 | Janssens |
| 2007/0016633 A1 | 1/2007 | Lindholm et al. |
| 2008/0040407 A1 | 2/2008 | Ge et al. |
| 2008/0065708 A1 | 3/2008 | Lake |
| 2008/0133212 A1 | 6/2008 | Krishnamurthy et al. |
| 2008/0244545 A1 | 10/2008 | Jamison |
| 2008/0281887 A1 | 11/2008 | Uola |
| 2009/0300092 A1 | 12/2009 | Corry et al. |
| 2010/0250629 A1 | 9/2010 | Obata et al. |
| 2011/0072427 A1 | 3/2011 | Garmark |
| 2011/0208791 A1 | 8/2011 | Lindholm et al. |
| 2012/0158801 A1 | 6/2012 | Devegowda et al. |
| 2012/0159477 A1 | 6/2012 | Veresov |
| 2012/0210309 A1 | 8/2012 | Jamison |
| 2012/0216015 A1 | 8/2012 | Mitra |
| 2012/0222005 A1 | 8/2012 | Harris et al. |
| 2012/0304173 A1 | 11/2012 | Garmark |
| 2012/0331018 A1 | 12/2012 | Khanna |
| 2013/0304771 A1 | 11/2013 | Khanna |
| 2014/0324924 A1 | 10/2014 | Ahad et al. |
| 2014/0351549 A1 | 11/2014 | Harris et al. |
| 2015/0128147 A1 | 5/2015 | Holt |
| 2016/0026392 A1 | 1/2016 | Harris et al. |
| 2016/0330423 A1 | 11/2016 | Wu et al. |
| 2017/0075802 A1 | 3/2017 | Jamison |
| 2018/0276119 A1 | 9/2018 | Kawachiya et al. |
| 2018/0276121 A1 | 9/2018 | Kawachiya et al. |

OTHER PUBLICATIONS

Shirazi, "Avoiding Garbage Collection," Oct. 25, 2018, https://www.oreilly.com/library/view/java-performance-tuning/0596000154/ch04s03.html, 6 pages.

www.dynatrace.com, "Java Memory Management," Oct. 25, 2018, https://www.dynatrace.com/resources/ebooks/javabook/how-garbage-collection-works/, 8 pages.

www.geeksforgeeks.org, "How to prevent objects of a class from Garbage Collection in Java," Oct. 25, 2018, https://www.geeksforgeeks.org/how-to-prevent-objects-of-a-class-from-garbage-collection-in-java/, 5 pages.

Dmitriev, "How to Prevent Your Java Collections From Wasting Memory," Jun. 4, 2018, https://dzone.com/articles/preventing-your-java-collections-from-wasting-memo, 8 pages.

LOW LATENCY GATEWAY FOR AN ASYNCHRONOUS ORCHESTRATION ENGINE USING DIRECT MEMORY

TECHNICAL FIELD

This disclosure relates generally to orchestration engine systems, and more specifically, to memory allocation and memory management associated with an orchestration engine system to improve latency response and ensure high levels of service.

BACKGROUND

An orchestration engine can be employed to manage computer resources in a network environment. An example of an orchestration engine is a gateway that manages data requests and data responses in a network environment. However, in certain network environments such as, for example, an online transaction system, a gateway is employed to process large numbers (e.g. millions) of transactions per day. For instance, a gateway in an online transaction system may be employed to unbundle, re-construct, orchestrate and consolidate hundreds of millions of data payloads per day for transactions. As such, undesirable latency is often introduced to process the transactions. Furthermore, memory related to an orchestration engine is often difficult to manage Applicant thus recognizes that improved memory management for an online gateway system would be desirable.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
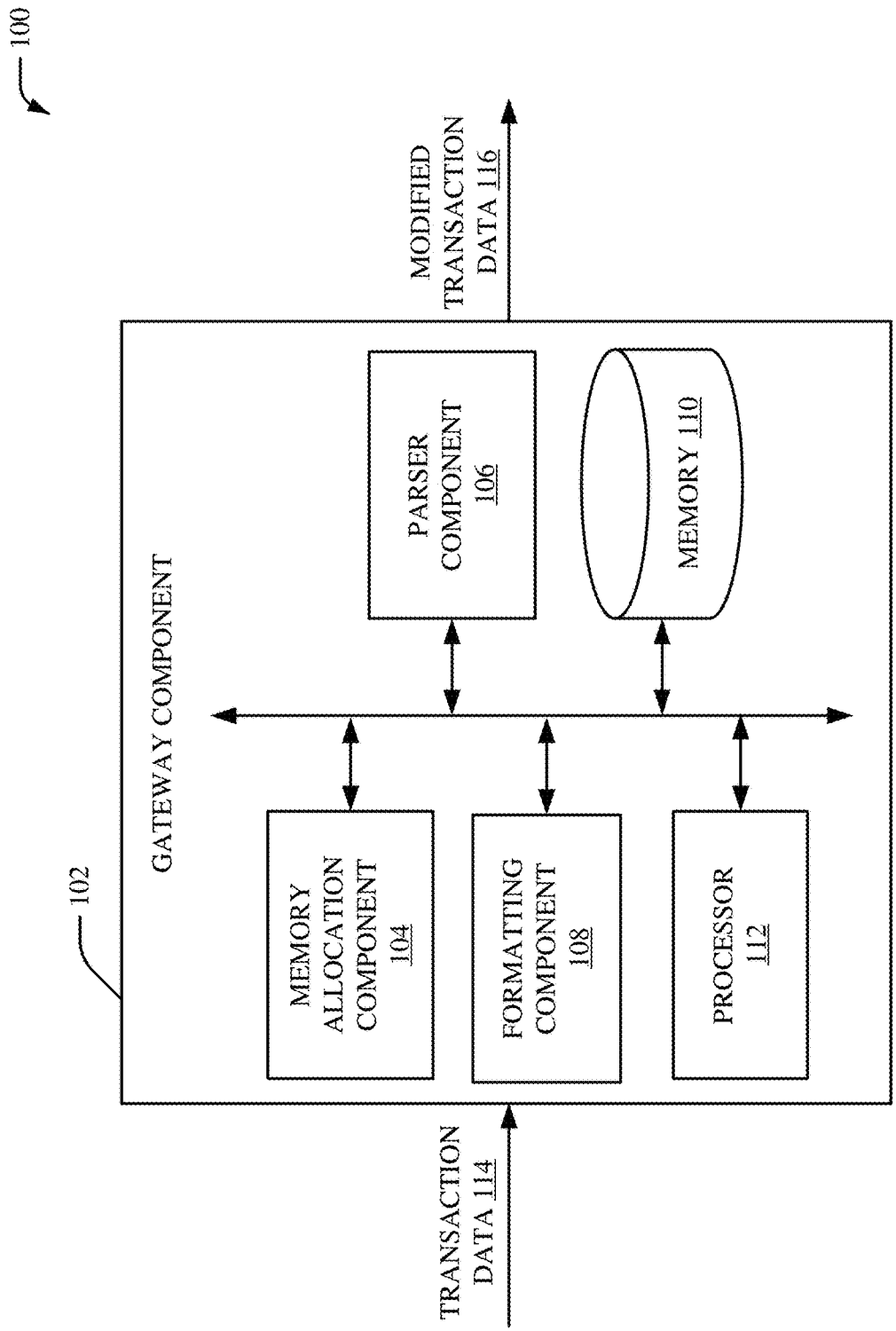
FIG. 1 illustrates a block diagram of an example, non-limiting system that includes a gateway component in accordance with one or more embodiments described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

A low latency gateway system, in some embodiments, is used to route transactional requests to various databases. Particularly in assessing the risk of whether to permit a particular online currency-based transaction to proceed, a decision about the risk level of the transaction may need to be reached rather quickly (e.g. within a few hundred milliseconds). Such a decision may require data from a number of different data sources, however. Because there is latency involved in these various data reads, it is advantageous for the gateway system itself (which may facilitate the various database queries) to have as little internal latency as possible.

One difficulty of implementing a gateway system arises from garbage collection. If the gateway system operates using a virtual machine (e.g. such as the JAVA™ virtual machine (VM)), at some point during operations the Java VM may initiate garbage collection in which previously used portions of memory may be de-allocated and then put back into an available pool of memory which can then again be re-used. This garbage collection, however, can introduce critical latency delays at the gateway system (as CPU and memory resources may become limited during the time that the garbage collection operations are underway). This latency can then result in service level agreements (SLAs) not being met. This can be particularly problematic when risk assessment operations are occurring on a continual, ongoing basis for electronic currency transactions. Failure to resolve risk decisions within the SLA time (e.g. several hundred milliseconds) can cause a transaction to fail when it should have been allowed, or can cause a transaction to be allowed (based on incomplete information) when it should not have. Thus, it is important in various embodiments of a gateway system to avoid delays incurred by VM garbage collection operations. This can be accomplished, as discussed further below, by directly managing memory associated with specific operations taken by the gateway system.

Systems and techniques for providing a low latency gateway for an asynchronous orchestration engine using direct memory are presented. For instance, low latency can be achieved by managing memory, reducing memory creation, reducing memory maintenance and/or reducing memory cleanup overhead. In an aspect, memory can be pre-allocated per data pipeline. For example, memory can be pre-allocated per incoming data pipeline, outgoing data pipeline, endpoint outgoing data pipeline, and endpoint incoming data pipeline. The memory can be, for example, an array data structure. In another example, the memory can be a ring buffer. The data pipelines can be separated, and memory management can be performed per each endpoint connection. The pre-allocated memory can be employed for generating data objects for deserialization, for generating data contexts, and/or for generating pipeline handlers. In an embodiment, input to the memory and/or output from the memory can be sequential. For instance, data can be provided and stored in the memory sequentially. Additionally or alternatively, data can be removed from the memory sequentially. In another embodiment, a data protocol for data messages can be varied based on information for endpoints that serve the data traffic. A data protocol for data messages can additionally or alternatively be varied based one or more memory requirements for the data messages. In certain embodiments, the data pipelines can be assigned to a particular processing core. As such, cache utilization by a processor of a gateway can be improved. For example, cache pollution can be reduced.

Furthermore, latency associated with a gateway can be reduced. Moreover, reliability of execution of a transaction by an online transaction system associated with a gateway can be improved, performance of an online transaction system associated with a gateway can be improved, and/or a computing experience with respect to an online transaction system associated with a gateway can be improved.

According to an embodiment, a system can include a memory allocation component, a parser component and a formatting component. The memory allocation component can be configured to directly allocate an array memory space within a first data structure for transaction data associated with a set of transaction requests for an online transaction system. The memory allocation component can also be configured to sequentially store respective data threads of the transaction data into respective memory blocks of the array memory space within the first data structure. Furthermore, the memory allocation component can be configured to re-use previously assigned space in the array memory space for additional transaction data responsive to a previous set of transaction requests having been completed and a new set of transaction requests having been initiated. The parser component can be configured to sequentially separate the memory blocks of the array memory space within the first data structure into a set of data channels for storage in a second data structure based on downstream application data for the respective data threads of the transaction data and endpoint data associated with a set of communication endpoint devices in the online transaction system.

In another embodiment, a method can provide for sequentially storing, by a system having a processor and a memory, respective transaction requests of transaction data received by a gateway router of an online transaction system to respective first memory blocks of a first array data structure, wherein the first array data structure was manually allocated from memory. The method can also provide for re-using, by the system, a previously assigned memory block in the first array data structure for an additional transaction request in response to a previous transaction request associated with the previously assigned memory block having been completed and the additional transaction request having been initiated. Furthermore, the method can provide for parsing, by the system, the respective transaction requests of transaction data into a set of data channels for storage in respective second memory blocks of a second array data structure that comprises a different size than the first array data structure. The method can also provide for formatting, by the system, the set of data channels as a set of communication pathways based on at least one serialization technique. Additionally, the method can provide for transmitting, by the system, the set of communication pathways to one or more processing cores of a virtual machine via the gateway router. As used herein, a "data channel" can be an information route between data structures.

In yet another embodiment, a non-transitory computer readable storage medium can comprise instructions that, in response to execution, cause a system including a processor and a memory to perform operations, comprising: pre-allocating respective data threads of transaction data for a gateway router associated with a virtual machine to an array memory space within a data structure, sequentially storing the respective data threads of the transaction data into respective memory blocks of the array memory space within the data structure, sequentially parsing the memory blocks of the array memory space within the data structure into a set of data channels based on downstream application data for the respective data threads of the transaction data and endpoint data associated with a set of communication endpoint devices in a communication network associated with the gateway router, formatting the set of data channels as a set of communication pathways based on at least one serialization technique associated with the set of communication pathways, and transmitting data associated with the set of data channels to one or more memories of the virtual machine via the communication network.

Referring initially to FIG. 1, there is illustrated an example system 100 that provides for a low latency gateway for an asynchronous orchestration engine using direct memory, in accordance with one or more embodiments described herein. The system 100 can be implemented on or in connection with a network of servers associated with an enterprise application. In one example, the system 100 can be associated with a cloud-based platform. In an embodiment, the system 100 can be associated with a computing environment that comprises one or more servers and/or one or more software components that operate to perform one or more processes, one or more functions and/or one or more methodologies in accordance with the described embodiments. A sever as disclosed herein can include, for example, stand-alone server and/or an enterprise-class server operating a server operating system (OS) such as a MICROSOFT® OS, a UNIX® OS, a LINUX® OS, and/or another suitable server-based OS. It is to be appreciated that one or more operations performed by a server and/or one or more services provided by a server can be combined, distributed, and/or separated for a given implementation. Furthermore, one or more servers can be operated and/or maintained by a corresponding entity or different entities. The system 100 can be employed by various systems, such as, but not limited to fraud prevention systems, risk management systems, transaction systems, payment systems, online transaction systems, online payment systems, server systems, electronic device systems, mobile device systems, smartphone systems, virtual machine systems, consumer service systems, security systems, mobile application systems, financial systems, digital systems, machine learning systems, artificial intelligence systems, neural network systems, network systems, computer network systems, communication systems, enterprise systems, a time-management system, a scheduling system, an electronic calendaring system, an asset management system, a work and productivity system, an email system, a cloud storage system, a messaging system, a social networking system, a note-taking system, a word processor system, a spreadsheet system, a presentation program system, and the like. In one example, the system 100 can be associated with a Platform-as-a-Service (PaaS). Moreover, the system 100 and/or the components of the system 100 can be employed to use hardware and/or software to solve problems that are highly technical in nature (e.g., related to artificial intelligence, related to machine learning, related to digital data processing, etc.), that are not abstract and that cannot be performed as a set of mental acts by a human.

The system 100 includes a gateway component 102. In FIG. 1, the gateway component 102 can include a memory allocation component 104, a parser component 106, and/or a formatting component 108. Note that in various embodiments, memory allocation component 104, parser component 106, and formatting component 108 may be implemented as stored software instructions that are executable by a processor to cause particular operations to occur. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the gateway component 102) can include memory 110 for storing computer executable components and instructions. The system 100 (e.g., the gateway component 102) can further include a processor 112 to facilitate operation of the instructions (e.g., computer executable components and instructions) by the system 100 (e.g., the gateway component 102).

The gateway component 102 (e.g., the memory allocation component 104 of the gateway component 102) can receive transaction data 114. The transaction data 114 can be data related to one or more transactions associated with one or more computing devices. The transaction data 114 can also be associated with one or more events (e.g., one or more transaction events) associated with one or more computing devices. In an aspect, an event associated with the transaction data 114 can include a numerical value corresponding to an amount for a transaction. Additionally or alternatively, an event associated with the transaction data 114 can include time data related to a timestamp for the transaction. An event associated with the transaction data 114 can additionally or alternatively include an item associated with the transaction and/or an identifier for one or more entities associated with the transaction. In certain embodiments, the transaction data 114 can include a set of transaction requests for an online transaction system. In certain embodiments, the transaction data 114 can be financial transaction data. For example, the transaction data 114 can be data to facilitate a transfer of funds for transactions between two entities. The one or more computing devices associated with the transaction data 114 can be one or more client devices, one or more user devices, one or more electronic devices one or more mobile devices, one or more smart devices, one or more smart phones, one or more tablet devices, one or more handheld devices, one or more portable computing devices, one or more wearable devices, one or more virtual reality devices, one or more computers, one or more desktop computers, one or more laptop computers, one or more point of sale (POS) devices and/or one or more other types of electronic devices associated with a display.

The memory allocation component 104 can directly allocate an array memory space within a first data structure for the transaction data 114. For instance, the memory allocation component 104 can assign respective portions of the transaction data 114 into the array memory space within the first data structure. The array memory space can be a memory space that includes a set of memory blocks. Respective memory blocks in the set of memory blocks can be associated with unique array indices. The memory allocation component 104 can sequentially store respective data threads of the transaction data 114 into respective memory blocks of the array memory space within the first data structure. In an aspect, the memory allocation component 104 can store a first data thread of the transaction data 114 in a first memory block of the array memory space within the first data structure, the memory allocation component 104 can store a second data thread of the transaction data 114 in a second memory block of the array memory space within the first data structure that is located next to the first memory block, the memory allocation component 104 can store a third data thread of the transaction data 114 in a third memory block of the array memory space within the first data structure that is located next to the second memory block, etc. The first data structure can be, for example, a linear array data structure. In another example, the first data structure can be a ring buffer. However, it is to be appreciated that the first data structure can be another type of data structure with an array memory space. In an embodiment, the memory allocation component 104 can sequentially store the respective data threads of the transaction data 114 into the respective memory blocks of the array memory space within the first data structure based on transaction flow data. The transaction flow data can be associated with a data pipeline action for the respective data threads of the transaction data 114. For example, the transaction flow data can indicate a type of data thread and/or a destination for the respective data threads. In certain implementations, the transaction flow data can identify whether a data thread is an incoming data thread, an outgoing data thread, an endpoint output data thread, an endpoint incoming data thread, or another type of data thread. In an embodiment, the memory allocation component 104 can re-use previously assigned space in the array memory space for additional transaction data. For instance, the memory allocation component 104 can re-use previously assigned space in the array memory space for additional transaction data responsive to a previous set of transaction requests having been completed and a new set of transaction requests having been initiated. In an example, a first data thread of the transaction data 114 that is stored in a first memory block of the array memory space within the first data structure can be removed from the first memory block. Furthermore, a new data thread of the transaction data 114 can be stored in the first memory block of the array memory space within the first data structure responsive to the first data thread having been removed from the first memory block.

The parser component 106 can sequentially separate the memory blocks of the array memory space within the first data structure into a set of data channels for storage in a second data structure. For instance, the parser component 106 can separate a first memory block of the array memory space within the first data structure into one or more data channels for storage in one or more memory blocks of the second data structure, the parser component 106 can separate a second memory block (e.g., a next memory block) of the array memory space within the first data structure into one or more other data channels for storage in one or more other memory blocks of the second data structure, etc. In an aspect, the parser component 106 can sequentially separate the memory blocks of the array memory space within the first data structure into the set of data channels for storage in the second data structure based on downstream application data for the respective data threads of the transaction data 114. A data channel from the set of data channels can be data associated with a data route between the first data structure and the second data structure. Data associated with a data channel from the set of data channels can also be temporarily stored in the second data structure. The downstream application data can include information related to one or more applications for the respective data threads of the transaction data 114. The downstream application data can include, for example, information related to a set of filters for the respective data threads of the transaction data 114. In an example, the downstream application data can include risk assessment data related to a predicted risk profile for the respective data threads of the transaction data 114. The downstream application data can additionally or alternatively include compliance data related to a set of compliance requirements for the respective data threads of the transaction data 114. Furthermore, the downstream application data can additionally or alternatively include limit data related to a set of limitations for the respective data threads of the transaction data 114. Additionally or alternatively, the parser component 106 can sequentially separate the memory blocks of the array memory space within the first data structure into the set of data channels for storage in the second data structure based on endpoint data associated with a set of communication endpoint devices in the online transaction system associated with the gateway component 102. The endpoint data can include, for example, information related to the set of communication endpoint devices. In an embodiment, the endpoint data can include information related to one or more processing cores associated with the set of communication endpoint devices. For example, the endpoint data can include information related to one or more processing cores of a virtual machine. Additionally or alternatively, the endpoint data can include information related to one or more memories for one or more processing cores of a virtual machine.

The second data structure can be a different size than the first data structure. For instance, the second data structure can include a different array memory space that is larger than the array memory space of the first data structure. In an example, the second data structure can include a greater number of memory blocks than the first data structure. The second data structure can be, for example, a linear array data structure. In another example, the second data structure can be a ring buffer. However, it is to be appreciated that the second data structure can be another type of data structure with an array memory space. In an embodiment, the parser component 106 can assign respective portions of data from the array memory space within the first data structure into the different array memory space within the second data structure. For example, the parser component 106 can assign respective portions of data from the memory blocks of the first data structure into the different memory blocks of the second data structure. In an aspect, the parser component 106 can sequentially store respective data from the memory blocks of the first data structure into respective memory blocks of the second data structure. In one example, data from a memory block of the first data structure can be divided and respectively stored in two or more memory blocks of the second data structure.

The formatting component 108 can respectively format the set of data channels. The formatting component 108 can also convert the set of data channels into a set of communication pathways for the online transaction system associated with the gateway component 102. In an embodiment, the formatting component 108 can respectively format the set of data channels and/or convert the set of data channels into a set of communication pathways based on at least one serialization technique. The at least one serialization technique can facilitate transmission of the set of data channels via the set of communication pathways to one or more processing cores of a virtual machine of the online transaction system. For example, the at least one serialization technique can facilitate transmission of the set of data channels via the set of communication pathways to one or more memories for one or more processing cores of a virtual machine of the online transaction system. In an embodiment, the at least one serialization technique can vary a data protocol for transmission of the set of data channels based on information for endpoints that serve the transmission of the set of data channels. The at least one serialization technique can additionally or alternatively vary a data protocol for transmission of the set of data channels based on memory requirements for the set of data channels and/or processing requirement for processing cores that execute data associated with the set of data channels. A communication pathway from the set of communication pathways can be a communication route for transmitting data through the online transaction system using a network protocol associated with network clients and/or network servers. For instance, a communication pathway from the set of communication pathways can be a communication route for transmitting data (e.g., data from a gateway router) to a device (e.g., a virtual machine) of the online transaction system. In one example, the at least one serialization technique can format the set of data channels into a hypertext transfer protocol for the set of communication pathways. In another example, the at least one serialization technique can format the set of data channels into a transmission control protocol for the set of communication pathways. In yet another example, the at least one serialization technique can format the set of data channels into an object serialization protocol (e.g., an objection serialization protocol associated with a virtual machine) for the set of communication pathways. However, it is to be appreciated that the at least one serialization technique can format the set of data channels in an different manner for the set of communication pathways. In an embodiment, the formatting component 108 can generate modified transaction data 116. The modified transaction data 116 can include data transmitted via the set of communication pathways. For instance, the modified transaction data 116 can be a modified version of the transaction data 114 to provide reduced latency with respect to transmission and/or employment by a memory management system.

In certain embodiments, the memory allocation component 104 can perform learning with respect to the transaction data 114 to facilitate memory allocation associated with the array memory space within the first data structure. The memory allocation component 104 can also generate inferences with respect to the transaction data 114. The memory allocation component 104 can, for example, employ principles of artificial intelligence to facilitate learning with respect to the transaction data 114. The memory allocation component 104 can perform learning with respect to the transaction data 114 explicitly or implicitly. Additionally or alternatively, the memory allocation component 104 can also employ an automatic classification system and/or an automatic classification process to facilitate learning and/or generating inferences with respect to the transaction data 114. For example, the memory allocation component 104 can employ a probabilistic and/or statistical-based analysis (e.g., factoring into the analysis utilities and costs) to learn and/or generate inferences with respect to the transaction data 114. The memory allocation component 104 can employ, for example, a support vector machine (SVM) classifier to learn and/or generate inferences with respect to the transaction data 114. Additionally or alternatively, the memory allocation component 104 can employ other classification techniques associated with Bayesian networks, decision trees and/or probabilistic classification models. Classifiers employed by the memory allocation component 104 can be explicitly trained (e.g., via a generic training data) as well as implicitly trained (e.g., via observing user behavior, receiving extrinsic information). For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class— that is, f(x)=confidence(class).

In an aspect, the memory allocation component 104 can include an inference component that can further enhance automated aspects of the memory allocation component 104 utilizing in part inference-based schemes with respect to the transaction data 114. The memory allocation component 104 can employ any suitable machine-learning based techniques, statistical-based techniques and/or probabilistic-based techniques. For example, the memory allocation component 104 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the memory allocation component 104 can perform a set of machine learning computations associated with the transaction data 114. For example, the memory allocation component 104 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, and/or a set of different machine learning computations.

Compared to a conventional system, the gateway component 102 can provide improved cache utilization by a processor of a gateway associated with transaction data and/or an online transaction system. Additionally, by employing the gateway component 102, cache pollution associated with transaction data and/or an online transaction system can be reduced. Latency associated with a gateway can also be reduced by employing the gateway component 102. In addition, by employing the gateway component 102, reliability of execution of a transaction by an online transaction system associated with a gateway can be improved, performance of an online transaction system associated with a gateway can be improved, and/or a computing experience with respect to an online transaction system associated with a gateway can be improved. Moreover, it is to be appreciated that technical features of the gateway component 102 and management of an orchestration engine process, etc. are highly technical in nature and not abstract ideas. Processing threads of the gateway component 102 that process the transaction data 114 cannot be performed by a human (e.g., are greater than the capability of a single human mind). For example, the amount of the transaction data 114 processed, the speed of processing of the transaction data 114 and/or the data types of the transaction data 114 analyzed by the gateway component 102 over a certain period of time can be respectively greater, faster and different than the amount, speed and data type that can be processed by a single human mind over the same period of time. Furthermore, the transaction data 114 analyzed by the gateway component 102 can be encoded data and/or compressed data associated with one or more computing devices. Moreover, the gateway component 102 can be fully operational towards performing one or more other functions (e.g., fully powered on, fully executed, etc.) while also analyzing the transaction data 114.

While FIG. 1 depicts separate components in the gateway component 102, it is to be appreciated that two or more components may be implemented in a common component. Further, it can be appreciated that the design of system 100 and/or the gateway component 102 can include other component selections, component placements, etc., to facilitate a low latency gateway for an asynchronous orchestrating engine.

Figure 2:
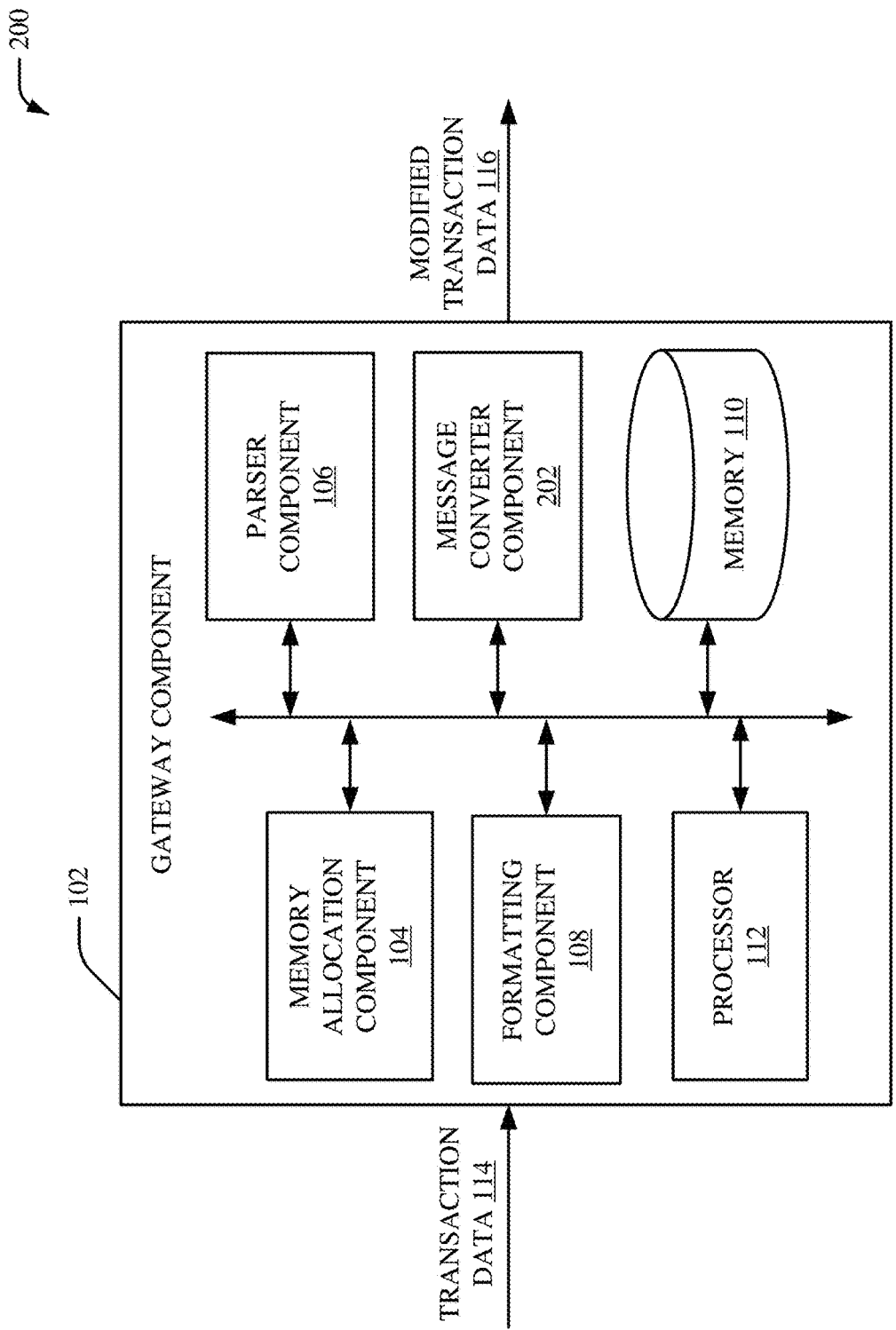
FIG. 2 illustrates a block diagram of another example, non-limiting system that includes a gateway component in accordance with one or more embodiments described herein.

FIG. 2 illustrates an example, non-limiting system 200 in accordance with one or more embodiments described herein. Repetitive description of like elements employed in other embodiments described herein is omitted for sake of brevity. The system 200 includes the gateway component 102. In FIG. 2, the gateway component 102 can include the memory allocation component 104, the parser component 106, the formatting component 108, the memory 110, the processor 112, and/or a message converter component 202. As above, message converter component 202 may be implemented as executable stored software instructions, in various embodiments.

The message converter component 202 can convert at least a portion of the transaction data 114 stored in the first data structure into two or more data channels for the set of data channels. The message converter component 202 can, for example, convert at least a portion of the transaction data 114 stored in the first data structure into two or more data channels for the set of data channels based on the downstream application data. For instance, the message converter component 202 can convert at least a portion of the transaction data 114 stored in the first data structure into two or more data channels for the set of data channels based on the risk assessment data, the compliance data and/or the limit data. In an aspect, the message converter component 202 can split data stored in a first memory of the first data structure (e.g., a portion of the transaction data 114 stored in the first memory block of the first data structure) into two or more data channels. Furthermore, the message converter component 202 can convert the data associated with the two or more data channels into a format for storage in the second data structure. For instance, the message converter component 202 can convert the data associated with the two or more data channels from a serialized format into an object element format for the second data structure. In an example, the message converter component 202 can convert data stored in a memory block of the first data structure into a first data channel associated with risk assessment data related to a predicted risk profile for the data in the memory block. Additionally or alternatively, the message converter component 202 can convert the data stored in the memory block of the first data structure into a second data channel associated with compliance data related to a set of compliance requirements for the data in the memory block. Additionally or alternatively, the message converter component 202 can convert the data stored in the memory block of the first data structure into a third data channel associated with limit data related to set of limitations for the data in the memory block. In an embodiment, data associated with the first data channel can be stored in a first memory block of the second data structure, data associated with the second data channel can be stored in a second memory block of the second data structure, and/or data associated with the third data channel can be stored in a third memory block of the second data structure. In certain embodiments, the message converter component 202 can covert a deserialized version of respective data threads of the transaction data 114 into two or more data channels for the set of data channels. For example, the message converter component 202 can convert a deserialized version of data stored in a memory block of the first data structure into two or more data channels for the set of data channels based on the risk assessment data, the compliance data and/or the limit data.

While FIG. 2 depicts separate components in the gateway component 102, it is to be appreciated that two or more components may be implemented in a common component. Further, it can be appreciated that the design of system 200 and/or the gateway component 102 can include other component selections, component placements, etc., to facilitate a low latency gateway for an asynchronous orchestrating engine.

Figure 3:
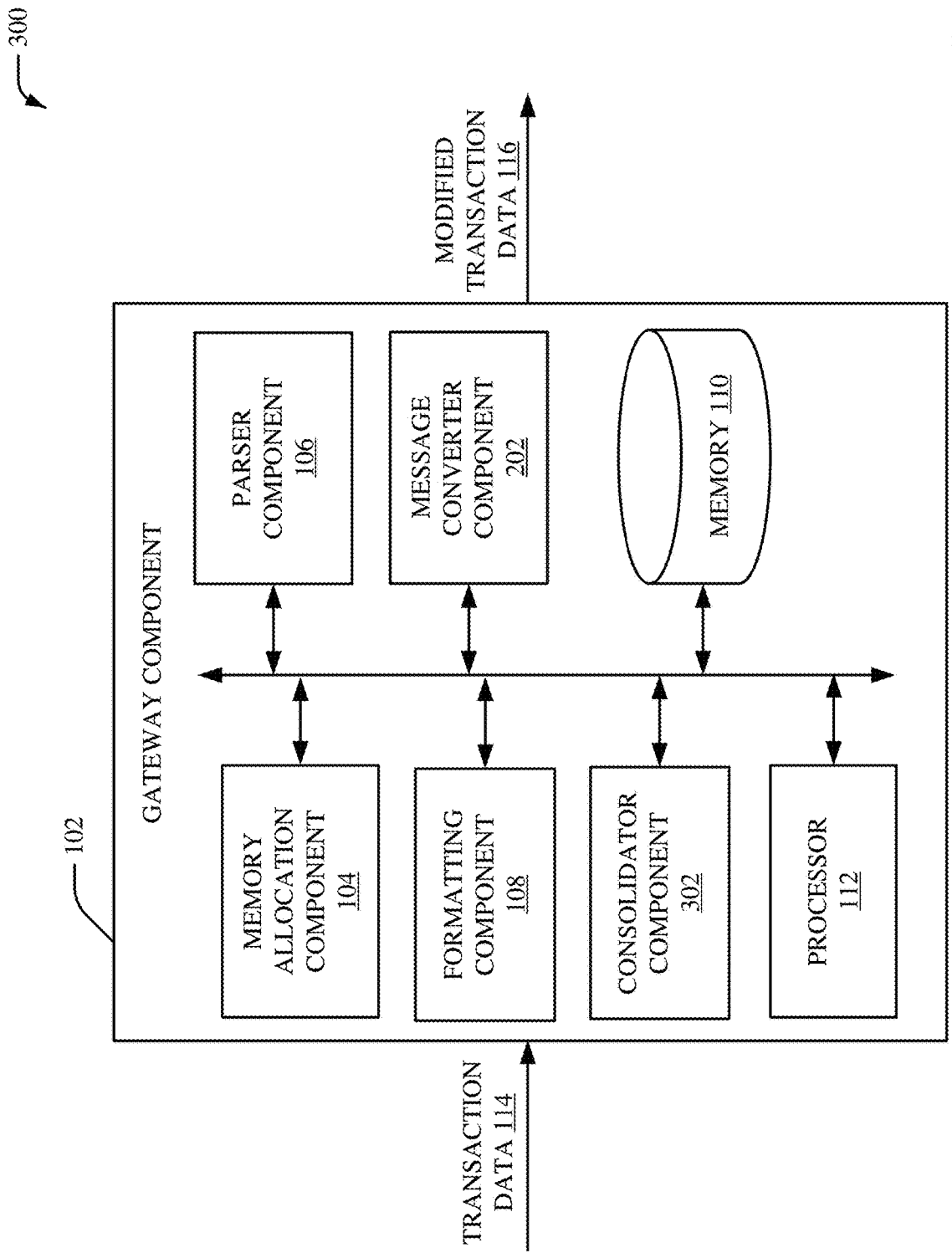
FIG. 3 illustrates a block diagram of yet another example, non-limiting system that includes a gateway component in accordance with one or more embodiments described herein.

FIG. 3 illustrates an example, non-limiting system 300 in accordance with one or more embodiments described herein. Repetitive description of like elements employed in other embodiments described herein is omitted for sake of brevity. The system 300 includes the gateway component 102 in the embodiment shown. In FIG. 3, the gateway component 102 can include the memory allocation component 104, the parser component 106, the formatting component 108, the memory 110, the processor 112, the message converter component 202, and/or a consolidator component 302.

The consolidator component 302 can convert two or more communication pathways from one or more memories of the virtual machine into a single data channel. The consolidator component 302 can, for example, convert two or more communication pathways from one or more memories of the virtual machine into a single data channel based on the downstream application data. For instance, the consolidator component 302 can convert two or more communication pathways from one or more memories of the virtual machine into a single data channel based on the risk assessment data, the compliance data and/or the limit data. In an example, the consolidator component 302 can convert data stored in a first memory block of the second data structure (e.g., a first memory block associated with risk assessment data), data stored in a second memory block of the second data structure (e.g., a second memory block associated with compliance data), and/or data stored in a third memory block of the second data structure (e.g., a third memory block associated with limit data) into a single data channel. For instance, the consolidator component 302 can consolidate the data stored in the first memory block of the second data structure, the data stored in the second memory block of the second data structure, and/or the data stored in the third data block of the second data structure into the single data channel. Additionally or alternatively, the consolidator component 302 can convert a format of the single data channel from a serialized format into an object element format for the first data structure. In an embodiment, data associated with the single data channel can be stored in a memory block of the first data structure. In certain embodiments, the consolidator component 302 can convert a deserialized version of data stored in a first memory block of the second data structure (e.g., a first memory block associated with risk assessment data), a deserialized version of data stored in a second memory block of the second data structure (e.g., a second memory block associated with compliance data), and/or a deserialized version of data stored in a third memory block of the second data structure (e.g., a third memory block associated with limit data) into the single data channel.

Figure 4:
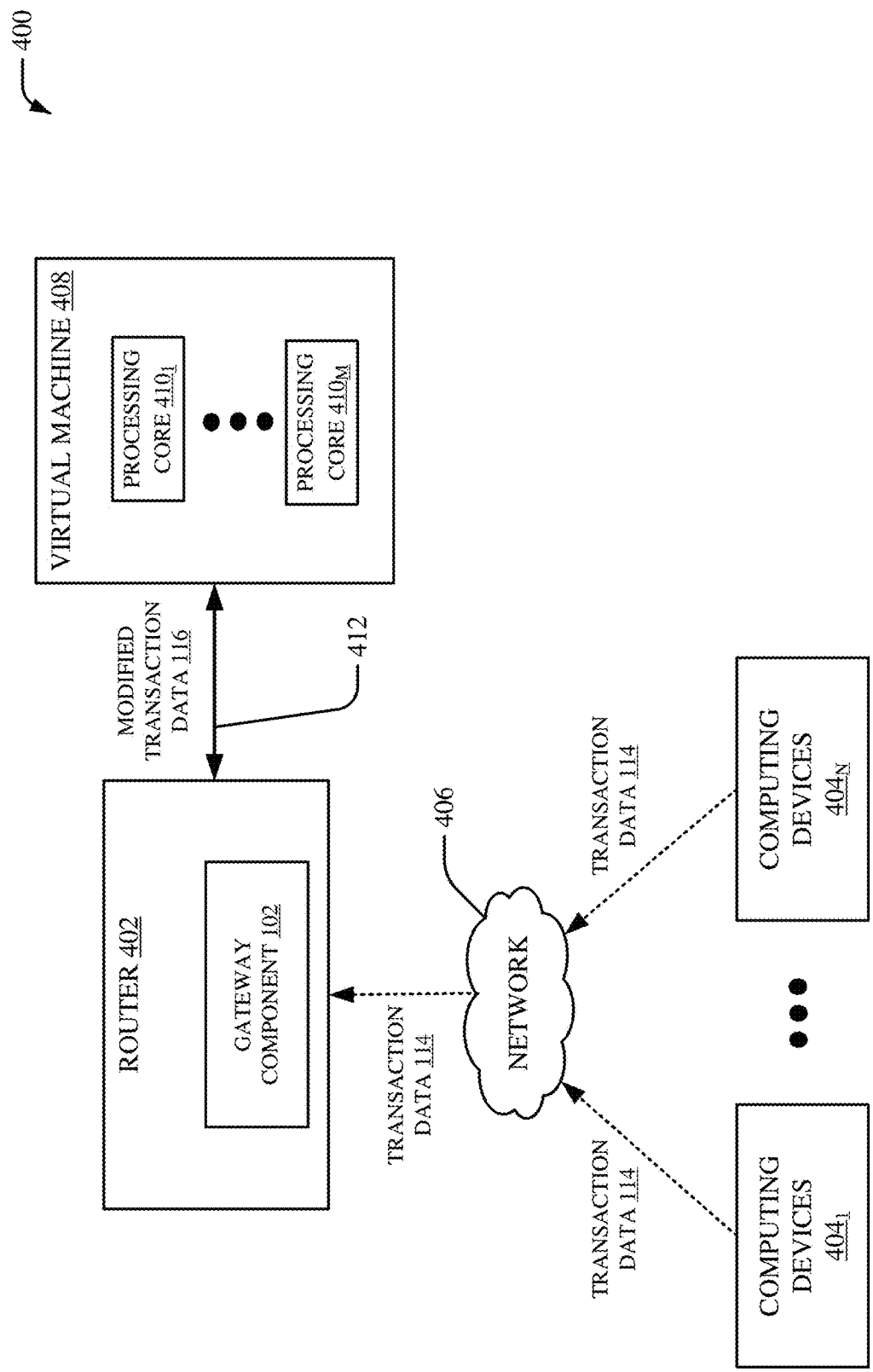
FIG. 4 illustrates an example, non-limiting system for providing a low latency gateway for an asynchronous orchestration engine using direct memory in accordance with one or more embodiments described herein.

FIG. 4 illustrates an example, non-limiting system 400 in accordance with one or more embodiments described herein. Repetitive description of like elements employed in other embodiments described herein is omitted for sake of brevity. The system 400 includes a router 402 and one or more computing devices $404_{1-N}$, where N is an integer. In an embodiment, the router 402 can be a gateway (e.g., a gateway router). Additionally or alternatively, the router 402 can be an orchestration engine (e.g., an asynchronous orchestration engine). The router 402 can include the gateway component 102. The router 402 and the one or more computing devices $404_{1-N}$ can be in communication via a network 406. The network 406 can be a communication network, a wireless network, an internet protocol (IP) network, a voice over IP network, an internet telephony network, a mobile telecommunications network, a landline telephone network, a personal area network, a wired network, and/or another type of network. The router 402 can be, for example, a stand-alone router and/or an enterprise-class router that includes an operating system such as a MICROSOFT® OS, a UNIX® OS, a LINUX® OS, and/or another suitable router-based OS. It is to be appreciated that one or more operations performed by the router 402 and/or one or more services provided by the router 402 can be combined, distributed, and/or separated for a given implementation. Furthermore, the router 402 can be associated with a transaction system, a payment system, an online transaction system, an online payment system, an enterprise system, and/or another type of system.

The one or more computing devices $404_{1-N}$ can be one or more client devices, one or more mobile devices, one or more smart devices (e.g. Internet-of-Things devices such as a smart TV), one or more smart phones, one or more tablet devices, one or more handheld devices, one or more portable computing devices, one or more wearable devices, one or more computers, one or more desktop computers, one or more laptop computers, one or more POS devices, and/or one or more other types of electronic devices associated with a display (i.e., a computing device 404 can be more than one of the type of devices listed above, which are non-exclusive categories in various embodiments). Furthermore, the one or more computing devices $404_{1-N}$ can respectively include one or more computing capabilities and/or one or more communication capabilities. In an aspect, the one or more computing devices $404_{1-N}$ can respectively provide one or more electronic device programs, such as system programs and application programs to perform various computing and/or communications operations. Some example system programs associated with the one or more computing devices $404_{1-N}$ can include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Some example application programs associated with the one or more computing devices $404_{1-N}$ can include, without limitation, a web browser application, a transaction application, a messaging application (e.g., e-mail, IM, SMS, MMS, telephone, voicemail, VoIP, video messaging, internet relay chat (IRC)), a contacts application, a calendar application, an electronic document application, a database application, a media application (e.g., music, video, television), a location-based services (LBS) application (e.g., GPS, mapping, directions, positioning systems, geolocation, point-of-interest, locator) that may utilize hardware components such as an antenna, and so forth. One or more of the electronic device programs associated with the one or more computing devices $404_{1-N}$ can display a graphical user interface to present information to and/or receive information from one or more users of the one or more computing devices $404_{1-N}$. In some embodiments, the electronic device programs associated with the one or more computing devices $404_{1-N}$ can include one or more applications configured to execute and/or conduct a transaction associated with the transaction data 114. In an embodiment, an application program associated with the one or more computing devices $404_{1-N}$ can be related to a transaction system, a payment system, an online transaction system, an online payment system, an enterprise system, and/or another type of system associated with the router 402. Thus, a computing device 404 may be used to conduct an electronic financial transaction (e.g. a payment of currency from one account to another account)—which may require a risk analysis decision facilitated by router 402.

In an embodiment, the router 402 that includes the gateway component 102 can receive the transaction data 114 via the network 406. For example, the router 402 that includes the gateway component 102 can receive the transaction data 114 from the one or more computing devices $304_{1-N}$. The one or more computing devices $404_{1-N}$ can generate at least a portion of the transaction data 114. In an embodiment, the router 402 that includes the gateway component 102 can process the transaction data 114 to facilitate providing the modified transaction data 116 to a virtual machine 408. In certain embodiments, the router 402 can include the first data structure and/or the second data structure to facilitate providing the modified transaction data 116 to a virtual machine 408. Additionally, the router 402 that includes the gateway component 102 can be employed to bypass a memory management system of the virtual machine 408 (e.g., certain portions of memory that might be subjected to automated garbage collection can be instead managed directly, thus allowing better compliance with latency requirements for processing transaction data 114 such as during an electronic currency transaction). As such, memory for managing the transaction data 114 can be pre-allocated. The virtual machine 408 can be, for example, a virtual machine of an online transaction system. Furthermore, the virtual machine 408 can include one or more processing cores $410_{1-M}$, where M is an integer. The one or more processing cores $410_{1-M}$ can be, for example, one or more virtual machine cores that execute respective processing threads and/or respective program instructions. The one or more processing cores $410_{1-M}$ can also be associated with one or more memories. In certain embodiments, the router 402 that includes the gateway component 102 can transmit the modified transaction data 116 to the virtual machine 408 via a set of communication pathways 412. For example, the set of communication pathways 412 can be one or more communication pathways between the router 402 and the virtual machine 408. As such, by employing the gateway component 102 in the system 400 for memory management and/or memory allocation, cache utilization by the router 402 can be improved. Additionally, by employing the gateway component 102 in the system 400 for memory management and/or memory allocation, cache pollution associated with the router 402 can be reduced. Latency associated with the router 402 can also be reduced by employing the gateway component 102. In addition, with the system 400, reliability of execution of a transaction by an online transaction system associated with the router 402 can be improved, performance of the router 402 can be improved, and/or a computing experience associated with the router 402 can be improved. Additionally, with the system 400, reliability of execution of a transaction by an online transaction system associated with the router 402 can be improved.

Figure 5:
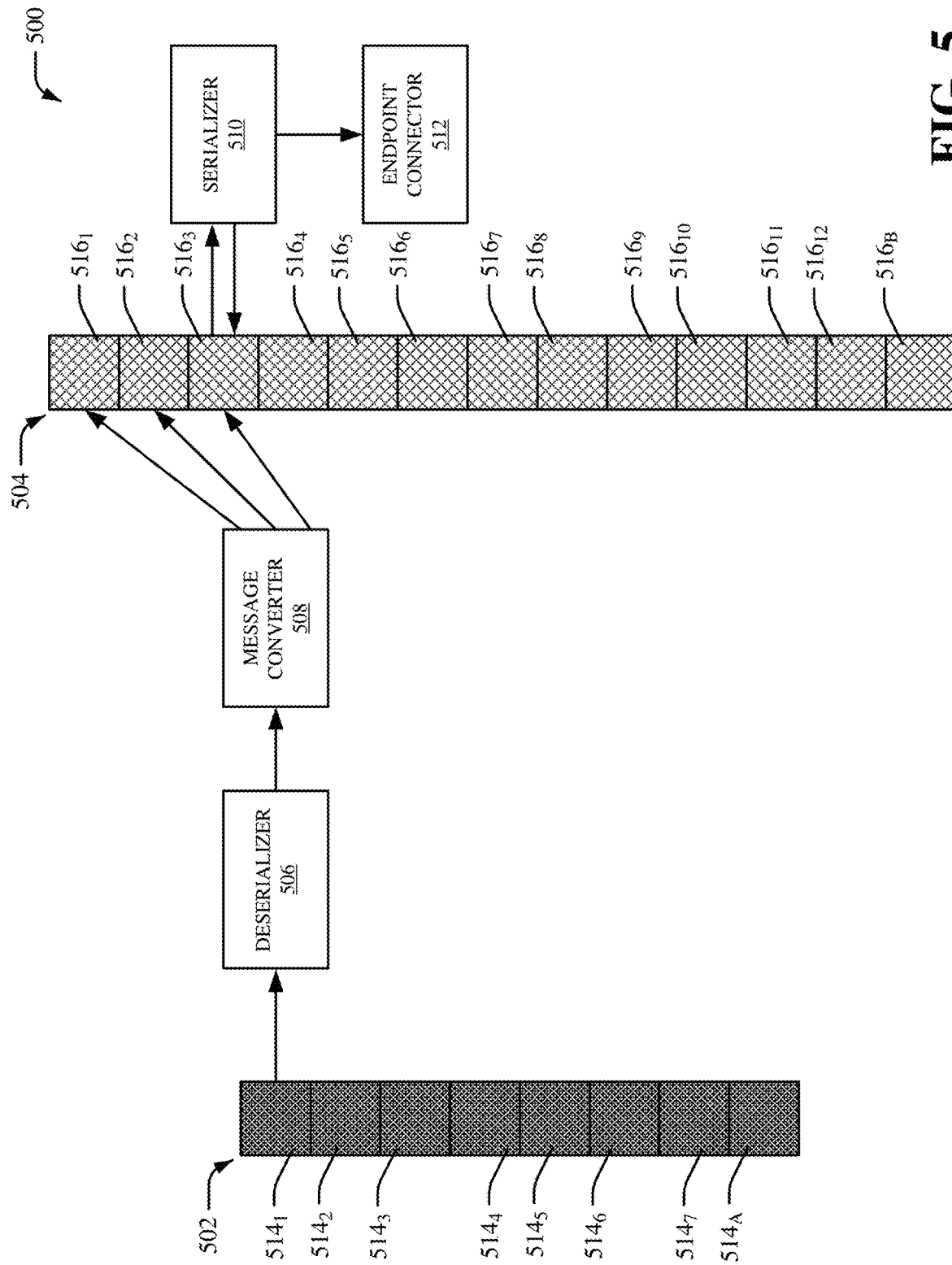
FIG. 5 illustrates an example, non-limiting system that includes a first data structure and a second data structure in accordance with one or more embodiments described herein.

FIG. 5 illustrates an example, non-limiting system 500 in accordance with one or more embodiments described herein. Repetitive description of like elements employed in other embodiments described herein is omitted for sake of brevity. The system 500 includes a first data structure 502 and a second data structure 504. The first data structure 502 can be, for example, the first data structure allocated by the memory allocation component 104 to store the transaction data 114. The second data structure 504 can be, for example, the second data structure employed by the parser component 106 to store data associated with the set of data channels. In certain embodiments, the first data structure 502 and/or the second data structure 504 can be included in a gateway router (e.g., the router 402). The system 500 also includes a deserializer 506, a message converter 508, a serializer 510 and/or an endpoint connector 512. The first data structure 502 can include a set of memory blocks $514_{1-A}$, where A is an integer. Furthermore, the second data structure 504 can include a set of memory blocks $516_{1-B}$, where B is an integer. The second data structure 504 can include a greater number of memory blocks than the first data structure 502. For instance, a number of memory blocks in the set of memory blocks $514_{1-A}$ can be greater than a number of memory blocks in the set of memory blocks $516_{1-B}$. In an aspect, the set of memory blocks $514_{1-A}$ associated with the first data structure 502 can be a first array memory space. The set of memory blocks $514_{1-A}$ can be structured as a linear array data structure. Alternatively, the set of memory blocks $514_{1-A}$ can be structured as a ring buffer. However, it is to be appreciated that the set of memory blocks $514_{1-A}$ can be structured as a different type of array memory space. In another aspect, the set of memory blocks $516_{1-B}$ associated with the second data structure 504 can be a second array memory space. The set of memory blocks $516_{1-B}$ can be structured as a linear array data structure. Alternatively, the set of memory blocks $516_{1-B}$ can be structured as a ring buffer.

In an example, the memory allocation component 104 can store a data thread of the transaction data 114 in the memory block $514_1$ of the first data structure. Furthermore, the parser component 106 can separate the memory block $514_1$ of the first data structure 502 into a set of data channels for storage in the second data structure 504. For instance, the parser component 106 can separate the memory block $514_1$ of the first data structure 502 into a first data channel for storage in the memory block $516_1$ of the second data structure 504, the parser component 106 can separate the memory block $514_1$ of the first data structure 502 into a second data channel for storage in the memory block $516_2$ of the second data structure 504, and the parser component 106 can separate the memory block $514_1$ of the first data structure 502 into a third data channel for storage in the memory block $516_3$ of the second data structure 504. In an embodiment, the deserializer 506 can convert the data thread of the transaction data 114 stored in the memory block $514_1$ from a serial format to a parallel format. Furthermore, the message converter 508 can convert the data thread of the transaction data 114 stored in the memory block $514_1$ into the first data channel, the second data channel and the third data channel for storage in the memory block $516_1$, the memory block $516_2$, and the memory block $516_3$, respectively. In another embodiment, the serializer 510 can convert data for respective data channels stored in the set of memory blocks $516_{1-B}$ into one or more communication pathways. The serializer 510 can also transmit the one or more communication pathways to the endpoint connector 512. The endpoint connector 512 can be, for example, an input interface for a device and/or a memory in an online transaction system. For example, the endpoint connector 512 can be an input interface for a virtual machine (e.g., the virtual machine 408) associated with an online transaction system. In another example, the endpoint connector 512 can be an input interface for a processor (e.g., a processing core) of a virtual machine associated with an online transaction system.

In an embodiment, the memory allocation component 104 can sequentially store respective data threads of the transaction data 114 into the set of memory blocks $514_{1-A}$ of the first data structure 502. For example, the memory allocation component 104 can store a first data thread of the transaction data 114 into the memory block $514_1$, the memory allocation component 104 can store a second data thread of the transaction data 114 into the memory block $514_2$, the memory allocation component 104 can store a third data thread of the transaction data 114 into the memory block $514_3$, etc. In another embodiment, the memory allocation component 104 can re-use one or more memory blocks from the set of memory blocks $514_{1-A}$ for additional transaction data 114 responsive to a previous set of transaction requests associated with the transaction data 114 having been completed and a new set of transaction requests associated with the transaction data 114 having been initiated. For example, in response to the data thread of the transaction data 114 stored in the memory block $514_1$ being stored in the second data structure 504, a new data thread of the transaction data 114 (e.g., a new data thread that is received next by the gateway component 102) can be stored in the memory block $514_1$. In yet another embodiment, the set of memory blocks $516_{1-B}$ of the second data structure 504 can be respectively assigned to processing cores. For instance, data stored in the memory block $516_1$ can be assigned and/or transmitted to a first processing core (e.g., processing core $410_1$) of a virtual machine, data stored in the memory block $516_2$ can be assigned and/or transmitted to a second processing core (e.g., processing core $410_2$) of the virtual machine, data stored in the memory block $516_3$ can be assigned and/or transmitted to a third processing core (e.g., processing core $410_3$) of the virtual machine, etc.

Figure 6:
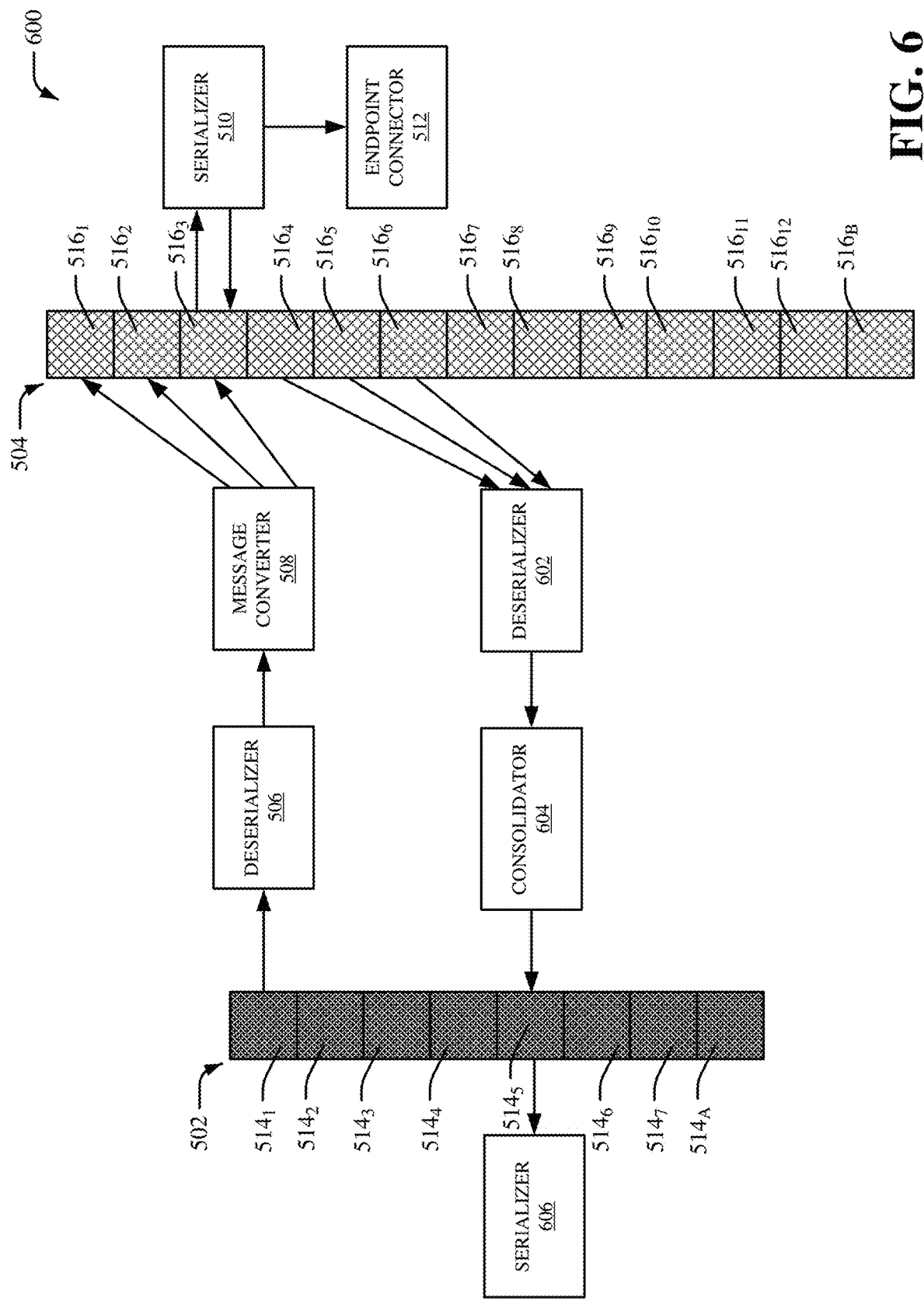
FIG. 6 illustrates another example, non-limiting system that includes a first data structure and a second data structure in accordance with one or more embodiments described herein.

FIG. 6 illustrates an example, non-limiting system 600 in accordance with one or more embodiments described herein. Repetitive description of like elements employed in other embodiments described herein is omitted for sake of brevity. The system 600 includes the first data structure 502 and the second data structure 504. The system 600 also includes the deserializer 506, the message converter 508, the serializer 510, the endpoint connector 512, the deserializer 602, the consolidator 604 and/or the serializer 606. In an embodiment, the deserializer 602 can convert data stored in the set of memory block $516_{1-B}$ from a parallel format to a serial format. For example, the deserializer 602 can convert data stored in the memory block $516_4$, data stored the memory block $516_5$, and data stored the memory block $516_6$ from a parallel format to a serial format. Additionally or alternatively, the consolidator 604 can consolidate data from multiple memory blocks of the set of memory block $516_{1-B}$ into a single data channel. In an example, the consolidator 604 can store the single data channel in a memory block (e.g., the memory block $514_5$) of the first data structure 502. In another embodiment, the serializer 606 can convert data for the single data channel stored in the memory block $514_5$ from a serial format to a parallel format.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
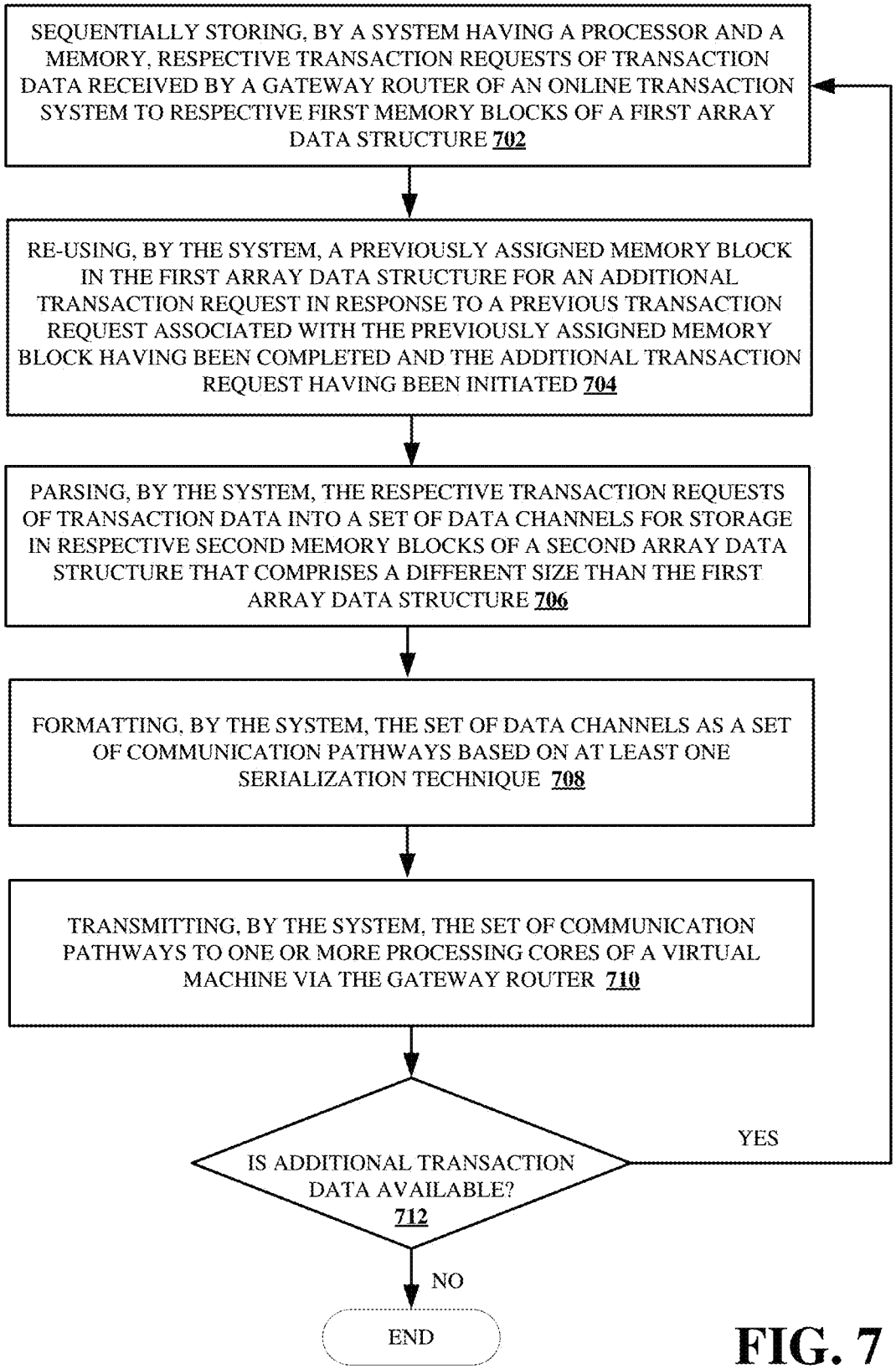
FIG. 7 illustrates a flow diagram of an example, non-limiting method for providing a low latency gateway for an asynchronous orchestration engine in accordance with one or more embodiments described herein.
Figure 8:
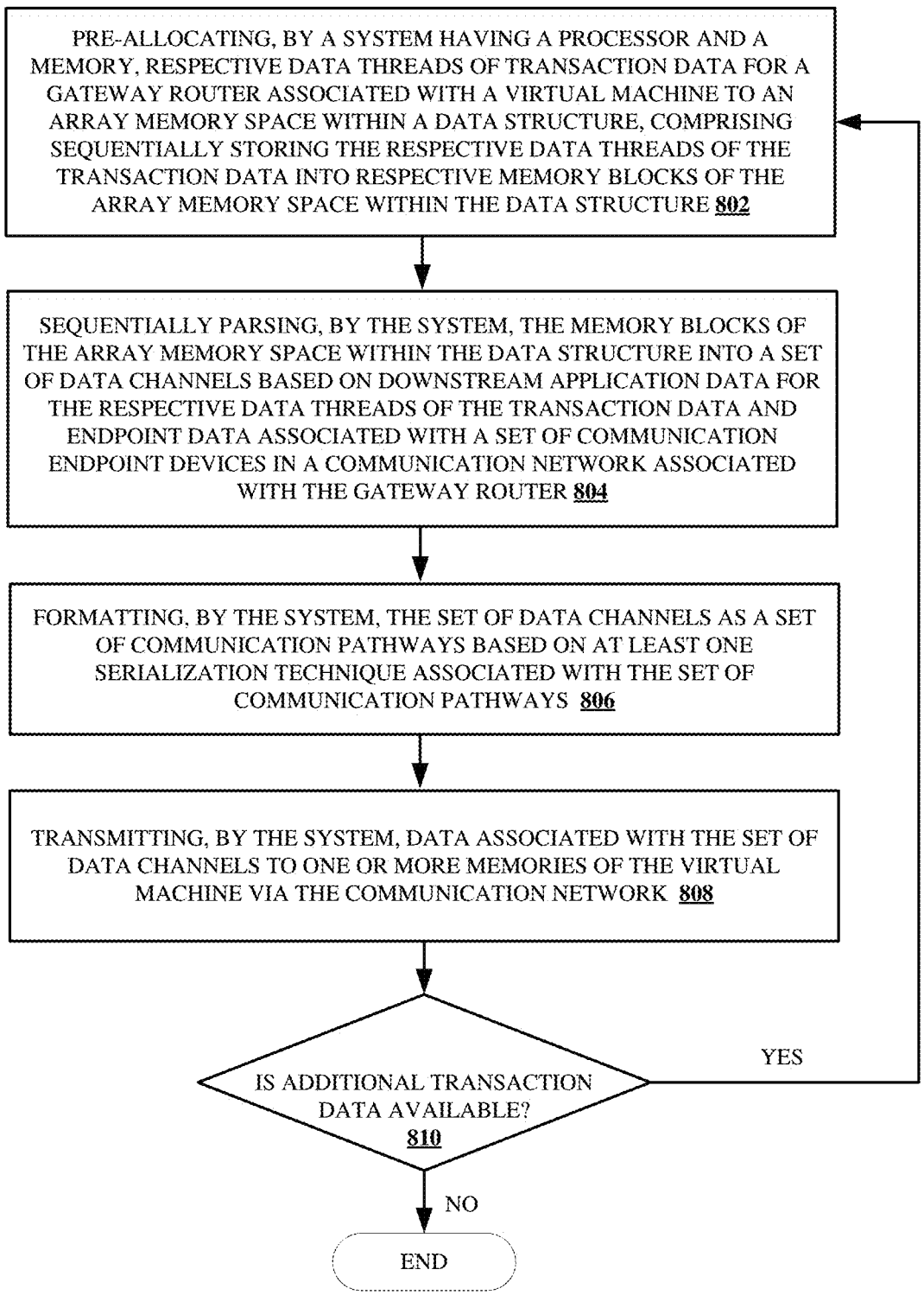
FIG. 8 illustrates a flow diagram of another example, non-limiting method for providing a low latency gateway for an asynchronous orchestration engine in accordance with one or more embodiments described herein.

FIGS. 7-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 7, there illustrated is a methodology 700 for providing a low latency gateway for an asynchronous orchestration engine, according to one or more embodiments of the subject innovation. Repetitive description of like elements employed in other embodiments described herein is omitted for sake of brevity. At 702, respective transaction requests of transaction data received by a gateway router of an online transaction system are sequentially stored, by a system having a processor and a memory (e.g., by memory allocation component 104), to respective first memory blocks of a first array data structure. In an embodiment, the first array data structure can be manually allocated from memory. The transaction data can be data related to one or more transactions associated with one or more computing devices. The transaction data can also be associated with one or more events (e.g., one or more transaction events) associated with one or more computing devices. In an aspect, an event associated with the transaction data can include a numerical value corresponding to an amount for a transaction. Additionally or alternatively, an event associated with the transaction data can include time data related to a timestamp for the transaction. An event associated with the transaction data can additionally or alternatively include an item associated with the transaction and/or an identifier for one or more entities associated with the transaction. In certain embodiments, the transaction data can be financial transaction data. For example, the transaction data can be data to facilitate a transfer of funds for transactions between two entities. In an embodiment, the one or more computing devices can be one or more client devices, one or more user devices, one or more electronic devices one or more mobile devices, one or more smart devices, one or more smart phones, one or more tablet devices, one or more handheld devices, one or more portable computing devices, one or more wearable devices, one or more computers, one or more desktop computers, one or more laptop computers, one or more POS devices, and/or one or more other types of electronic devices associated with a display. In an embodiment, the first memory blocks of the first array data structure can be an array memory space for the first array data structure. The first array data structure can be, for example, a linear array data structure such that the first memory blocks are configured as a linear array. In another example, the first array data structure can be a ring buffer such that the first memory blocks are configured as a ring buffer array.

At 704, a previously assigned memory block in the first array data structure is re-used, by the system (e.g., by memory allocation component 104), for an additional transaction request in response to a previous transaction request associated with the previously assigned memory block having been completed and the additional transaction request having been initiated. For instance, the previously assigned memory block can be a memory block that previously stored a transaction request associated with the transaction data. In an example, data from the previously assigned memory block in the first array data structure can be removed. Furthermore, a new transaction request can be received by the gateway router and can be stored in the previously assigned memory block.

At 706, the respective transaction requests of transaction data are parsed, by the system (e.g., by parser component 106), into a set of data channels for storage in respective second memory blocks of a second array data structure that comprises a different size than the first array data structure. In an embodiment, the second memory blocks of the second array data structure can be an array memory space for the second array data structure. The second array data structure can be, for example, a linear array data structure such that the second memory blocks are configured as a linear array. In another example, the second array data structure can be a ring buffer such that the second memory blocks are configured as a ring buffer array. In another embodiment, the first memory blocks of the first array data structure can be parsed into the set of data channels for storage in the second array data structure based on downstream application data for the respective transaction requests of the transaction data. The downstream application data can include information related to one or more applications for the respective transaction requests of the transaction data. The downstream application data can include, for example, information related to a set of filters for the respective transaction requests of the transaction data. In an example, the downstream application data can include risk assessment data related to a predicted risk profile for the respective transaction requests of the transaction data. The downstream application data can additionally or alternatively include compliance data related to a set of compliance requirements for the respective transaction requests of the transaction data. Furthermore, the downstream application data can additionally or alternatively include limit data related to a set of limitations for the respective transaction requests of the transaction data. Additionally or alternatively, the first memory blocks of the first array data structure can be parsed into the set of data channels for storage in the second array data structure based on endpoint data associated with a set of communication endpoint devices in the online transaction system associated with the gateway router. The endpoint data can include, for example, information related to the set of communication endpoint devices. In an embodiment, the endpoint data can include information related to one or more processing cores associated with the set of communication endpoint devices. For example, the endpoint data can include information related to one or more processing cores of a virtual machine. Additionally or alternatively, the endpoint data can include information related to one or more memories for one or more processing cores of a virtual machine.

At 708, the set of data channels are formatted, by the system (e.g., by formatting component 108), as a set of communication pathways based on at least one serialization technique. A communication pathway from the set of communication pathways can be a communication channel for transmitting data through the online transaction system. For instance, a communication pathway from the set of communication pathways can be a communication channel for transmitting data from the gateway router to a device (e.g., a virtual machine of the online transaction system.

At 710, the set of communication pathways are transmitted, by the system (e.g., by formatting component 108), to one or more processing cores of a virtual machine via the gateway router. The one or more processing cores can be, for example, one or more virtual machine cores that execute respective processing threads and/or respective program instructions. The one or more processing cores can also be associated with one or more memories.

At 712, it is determined whether additional transaction data is available. If yes, the methodology 700 returns to 702. If no, the methodology 700 can end. In certain embodiments, the methodology 700 can additionally or alternatively include directly allocating the respective portions of the transaction requests of the transaction data to the first array data structure prior to the transmitting the set of communication pathways to the one or more processing cores of the virtual machine. In certain embodiments, the methodology 700 can additionally or alternatively include parsing the respective transaction requests of transaction data into the set of data channels based on downstream application data for the respective transaction requests of the transaction data. In certain embodiments, the methodology 700 can additionally or alternatively include parsing the respective transaction requests of transaction data into the set of data channels based on endpoint data associated with a set of communication endpoint devices in a communication network associated with the gateway router. In certain embodiments, the methodology 700 can additionally or alternatively include directly storing the respective portions of the transaction requests of the transaction data into a linear data array structure prior to the transmitting the set of communication pathways to the one or more processing cores of the virtual machine. In certain embodiments, the methodology 700 can additionally or alternatively include storing the respective portions of the transaction requests of the transaction data into a ring buffer prior to the transmitting the set of communication pathways to the one or more processing cores of the virtual machine. In certain embodiments, the methodology 700 can additionally or alternatively include reducing latency of the gateway router with respect to a memory management system for the one or more processing cores of the virtual machine.

Referring to FIG. 8, there illustrated is a methodology 800 for providing a low latency gateway for an asynchronous orchestration engine, according to one or more embodiments of the subject innovation. Repetitive description of like elements employed in other embodiments described herein is omitted for sake of brevity. At 802, respective data threads of transaction data for a gateway router associated with a virtual machine are pre-allocated, by a system having a processor and a memory (e.g., by memory allocation component 104), to an array memory space within a data structure, comprising sequentially storing the respective data threads of the transaction data into respective memory blocks of the array memory space within the data structure. The transaction data can be data related to one or more transactions associated with one or more computing devices. The transaction data can also be associated with one or more events (e.g., one or more transaction events) associated with one or more computing devices. In an aspect, an event associated with the transaction data can include a numerical value corresponding to an amount for a transaction. Additionally or alternatively, an event associated with the transaction data can include time data related to a timestamp for the transaction. An event associated with the transaction data can additionally or alternatively include an item associated with the transaction and/or an identifier for one or more entities associated with the transaction. In certain embodiments, the transaction data can be financial transaction data. For example, the transaction data can be data to facilitate a transfer of funds for transactions between two entities. In an embodiment, the one or more computing devices can be one or more client devices, one or more user devices, one or more electronic devices one or more mobile devices, one or more smart devices, one or more smart phones, one or more tablet devices, one or more handheld devices, one or more portable computing devices, one or more wearable devices, one or more computers, one or more desktop computers, one or more laptop computers, one or more POS devices, and/or one or more other types of electronic devices associated with a display. In an embodiment, the data structure can an array data structure. For example, the data structure can be a linear array data structure. In another example, the data structure can be a ring buffer.

At 804, the memory blocks of the array memory space within the data structure are sequentially parsed, by the system (e.g., by parser component 106), into a set of data channels based on downstream application data for the respective data threads of the transaction data and endpoint data associated with a set of communication endpoint devices in a communication network associated with the gateway router. In certain embodiments, the set of data channels can be temporarily stored in a different data structure. The different data structure can a different array data structure. For example, the different data structure can be a different linear array data structure. In another example, the different data structure can be a different ring buffer.

At 806, the set of data channels are formatted, by the system (e.g., by formatting component 108), as a set of communication pathways based on at least one serialization technique associated with the set of communication pathways. A communication pathway from the set of communication pathways can be a communication channel for transmitting data through the online transaction system. For instance, a communication pathway from the set of communication pathways can be a communication channel for transmitting data from the gateway router to a device (e.g., a virtual machine of the online transaction system.

At 808, data associated with the set of data channels is transmitted, by the system (e.g., by formatting component 108), to one or more memories of the virtual machine via the communication network. The one or more memories can be associated with one or more processing cores of the virtual machine. For example, the data associated with the data channels can be executed and/or employed by the one or more processing cores of the virtual machine.

At 810, it is determined whether additional transaction data is available. If yes, the methodology 800 returns to 802. If no, the methodology 800 can end. In certain embodiments, the methodology 800 can additionally or alternatively include pre-allocating the respective data threads of the transaction data for the gateway router associated with the virtual machine to a linear data array prior to the transmitting the data to the one or more memories of the virtual machine. In certain embodiments, the methodology 800 can additionally or alternatively include pre-allocating the respective data threads of the transaction data for the gateway router associated with the virtual machine to a ring buffer prior to the transmitting the data to the one or more memories of the virtual machine. In certain embodiments, the methodology 800 can additionally or alternatively include re-using a previously assigned memory block associated with the array memory space within the data structure for additional transaction data in response to previous transaction data associated with the previously assigned memory block having been completed and the additional transaction data having been initiated.

Figure 9:
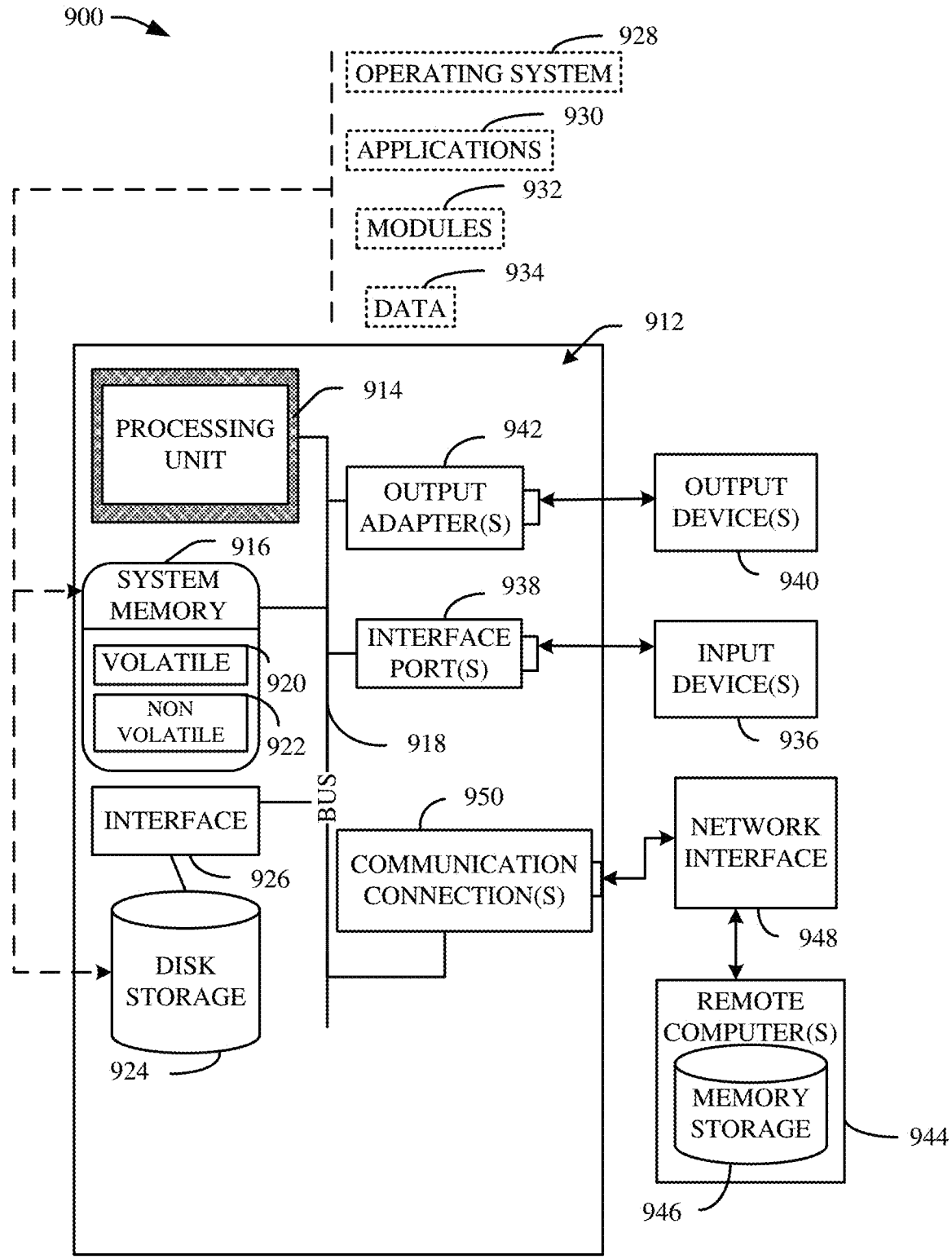
FIG. 9 is a schematic block diagram illustrating a suitable operating environment.
Figure 10:
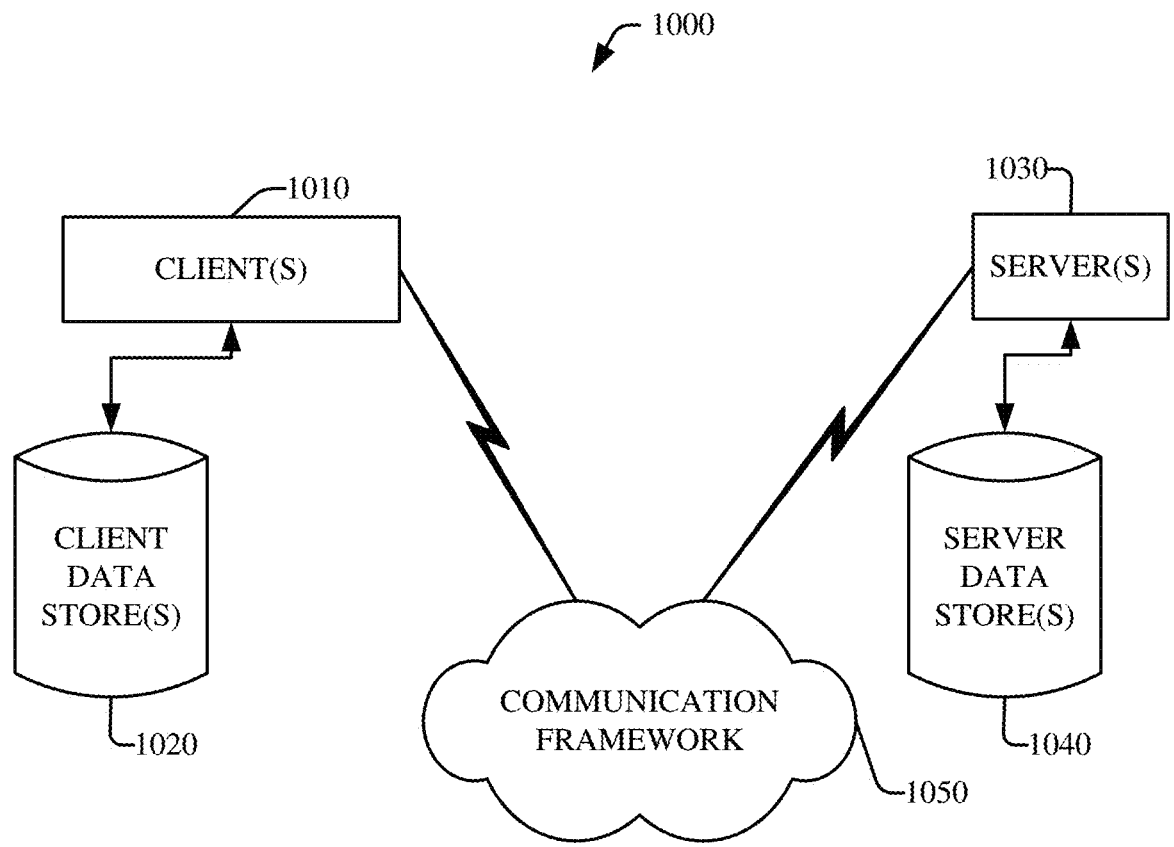
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented.

With reference to FIG. 9, a suitable environment 900 for implementing various aspects of this disclosure includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 also includes removable/non-removable, volatile/non-volatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computer system 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 with which the subject matter of this disclosure can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory;
   a processor configured to execute computer executable components stored in the memory, wherein the computer executable components comprise:
      a memory allocation component configured to directly allocate an array memory space within a first data structure for transaction data associated with a set of transaction requests for an online transaction system, wherein the memory allocation component is configured to sequentially store respective data threads of the transaction data into respective memory blocks of the array memory space within the first data structure, and wherein the memory allocation component is configured to re-use previously assigned space in the array memory space for additional transaction data responsive to a previous set of transaction requests having been completed and a new set of transaction requests having been initiated;
      a parser component configured to sequentially separate the memory blocks of the array memory space within the first data structure into a set of data channels for storage in a second data structure based on downstream application data for the respective data threads of the transaction data and endpoint data associated with a set of communication endpoint devices in the online transaction system; and
      a formatting component configured to respectively format the set of data channels and convert the set of data channels into a set of communication pathways for the online transaction system based on at least one serialization technique for transmission to one or more memories of a virtual machine of the online transaction system.

2. The system of claim 1, wherein the memory allocation component is configured to sequentially store the respective data threads of the transaction data into the respective memory blocks of the array memory space within the first data structure based on transaction flow data associated with a data pipeline action for the respective data threads of the transaction data.

3. The system of claim 1, wherein the memory allocation component is configured to directly allocate a linear array data structure for the transaction data.

4. The system of claim 1, wherein the memory allocation component is configured to directly allocate a ring buffer for the transaction data.

5. The system of claim 1, wherein the formatting component is configured to respectively assigns subsets of the set of communication pathways to respective processing cores of the virtual machine.

6. The system of claim 1, wherein the computer executable components further comprise
   a message converter component configured to convert a portion of the transaction data stored in the first data structure into at least a first data channel and a second data channel based on risk assessment data for the respective data threads of the transaction data.

7. The system of claim 1, wherein the computer executable components further comprise a consolidator component configured to convert a first communication pathway and a second communication pathway from the one or more memories of the virtual machine into a single data channel based on the downstream application data.

8. The system of claim 1, wherein the second data structure comprises a different size than the first data structure.

9. The system of claim 1, wherein the formatting component is configured to manage transmission of the set of communication pathways to the one or more memories of a virtual machine to reduce latency of a gateway router with respect to a memory management system for the one or more memories of the virtual machine.

10. A computer-implemented method, comprising:
   sequentially storing, by a system having a processor and a memory, respective transaction requests of transaction data received by a gateway router of an online transaction system to respective first memory blocks of a first array data structure, wherein the first array data structure was manually allocated from memory;
   re-using, by the system, a previously assigned memory block in the first array data structure for an additional transaction request in response to a previous transaction request associated with the previously assigned memory block having been completed and the additional transaction request having been initiated;
   parsing, by the system, the respective transaction requests of transaction data into a set of data channels for storage in respective second memory blocks of a second array data structure that comprises a different size than the first array data structure;
   formatting, by the system, the set of data channels as a set of communication pathways based on at least one serialization technique; and
   transmitting, by the system, the set of communication pathways to one or more processing cores of a virtual machine via the gateway router.

11. The computer-implemented method of claim 10, wherein the sequentially storing the respective portions of the transaction requests of the transaction data comprises directly allocating the respective portions of the transaction requests of the transaction data to the first array data structure prior to the transmitting the set of communication pathways to the one or more processing cores of the virtual machine.

12. The computer-implemented method of claim 10, wherein the parsing comprises parsing the respective transaction requests of transaction data into the set of data channels based on downstream application data for the respective transaction requests of the transaction data.

13. The computer-implemented method of claim 10, wherein the parsing comprises parsing the respective transaction requests of transaction data into the set of data channels based on endpoint data associated with a set of communication endpoint devices in a communication network associated with the gateway router.

14. The computer-implemented method of claim 10, wherein the sequentially storing the respective portions of the transaction requests of the transaction data comprises directly storing the respective portions of the transaction requests of the transaction data into a linear data array structure prior to the transmitting the set of communication pathways to the one or more processing cores of the virtual machine.

15. The computer-implemented method of claim 10, wherein the sequentially storing the respective portions of the transaction requests of the transaction data comprises storing the respective portions of the transaction requests of the transaction data into a ring buffer prior to the transmitting the set of communication pathways to the one or more processing cores of the virtual machine.

16. The computer-implemented method of claim 10, wherein the transmitting the set of communication pathways to one or more processing cores of the virtual machine comprises reducing latency of the gateway router with respect to a memory management system for the one or more processing cores of the virtual machine.

17. A non-transitory computer readable medium comprising instructions that, in response to execution, cause a system including a processor and a memory to perform operations comprising:

pre-allocating respective data threads of transaction data for a gateway router associated with a virtual machine to an array memory space within a data structure, comprising sequentially storing the respective data threads of the transaction data into respective memory blocks of the array memory space within the data structure;

sequentially parsing the memory blocks of the array memory space within the data structure into a set of data channels based on downstream application data for the respective data threads of the transaction data and endpoint data associated with a set of communication endpoint devices in a communication network associated with the gateway router;

formatting the set of data channels as a set of communication pathways based on at least one serialization technique associated with the set of communication pathways; and transmitting data associated with the set of data channels to one or more memories of the virtual machine via the communication network.

18. The non-transitory computer readable medium of claim 17, wherein the operations further comprise:

pre-allocating the respective data threads of the transaction data for the gateway router associated with the virtual machine to a linear data array prior to the transmitting the data to the one or more memories of the virtual machine.

19. The non-transitory computer readable medium of claim 17, wherein the operations further comprise:

pre-allocating the respective data threads of the transaction data for the gateway router associated with the virtual machine to a ring buffer prior to the transmitting the data to the one or more memories of the virtual machine.

20. The non-transitory computer readable medium of claim 17, wherein the operations further comprise:

re-using a previously assigned memory block associated with the array memory space within the data structure for additional transaction data in response to previous transaction data associated with the previously assigned memory block having been completed and the additional transaction data having been initiated.

\* \* \* \* \*